(12) United States Patent
Mostert et al.

(10) Patent No.: US 11,445,694 B2
(45) Date of Patent: Sep. 20, 2022

(54) MILKING SYSTEM

(71) Applicant: Lely Patent N.V., Maassluis (NL)

(72) Inventors: Gerard Mostert, Maassluis (NL); Frans Emo Diderik Van Halsema, Maassluis (NL); Rik Steenbergen, Maassluis (NL)

(73) Assignee: Lely Patent N.V., Maassluis (NL)

( * ) Notice: Subject to any disclaimer, the term of this patent is extended or adjusted under 35 U.S.C. 154(b) by 282 days.

(21) Appl. No.: 16/467,391

(22) PCT Filed: Nov. 27, 2017

(86) PCT No.: PCT/NL2017/050780
§ 371 (c)(1),
(2) Date: Jun. 6, 2019

(87) PCT Pub. No.: WO2018/111094
PCT Pub. Date: Jun. 21, 2018

(65) Prior Publication Data
US 2020/0060217 A1    Feb. 27, 2020

(30) Foreign Application Priority Data
Dec. 14, 2016  (NL) ..................................... 2017994

(51) Int. Cl.
*A01J 5/01*         (2006.01)
*A01J 5/007*        (2006.01)
*A01J 5/013*        (2006.01)

(52) U.S. Cl.
CPC ............. *A01J 5/0135* (2013.01); *A01J 5/007* (2013.01); *A01J 5/01* (2013.01); *A01J 5/0131* (2013.01)

(58) Field of Classification Search
CPC .. A01J 5/01; A01J 5/007; A01J 5/0135; A01J 5/0131
See application file for complete search history.

(56) References Cited

U.S. PATENT DOCUMENTS 4,231,324 A * 11/1980 Schletter .................. A01J 5/01
                                                      119/14.17
4,648,350 A *  3/1987 Noorlander ............... A01J 5/08
                                                      119/14.32
(Continued)

FOREIGN PATENT DOCUMENTS

DE       3609275 A1 *  9/1987  .............. A01J 5/007
EP     1 000 535 A1      5/2000
(Continued)

OTHER PUBLICATIONS

International Search Report dated Feb. 16, 2018 in PCT/NL2017/050780 filed on Nov. 27, 2017.
(Continued)

*Primary Examiner* — Joshua D Huson
*Assistant Examiner* — Megan J Moroney
(74) *Attorney, Agent, or Firm* — Oblon, McClelland, Maier & Neustadt, L.L.P.

(57) ABSTRACT

A milking system for milking of a milk animal, including a milking cup for obtaining the milk, the milking cup having a teat space with a first milk outflow opening, and a measuring chamber directly and rigidly connected to the milking cup for at least temporarily containing the obtained milk. The measuring chamber is provided with a milk inflow opening which is in flow communication with the first milk outflow opening, a second milk outflow opening, a vacuum outlet, and a sensor device for measuring a property of the milk in the measuring chamber. The sensor device includes an optical sensor device having a plurality of optical sensor elements, at least one light source, and a control unit which is configured to process sensor signals into values of at least two parameters of the milk in the measuring chamber.

20 Claims, 5 Drawing Sheets

(56) References Cited

U.S. PATENT DOCUMENTS

| | | | | |
|---|---|---|---|---|
| 5,275,124 | A * | 1/1994 | van der Lely | A01J 7/022 |
| | | | | 119/14.08 |
| 5,568,788 | A * | 10/1996 | van den Berg | A01J 5/0133 |
| | | | | 119/14.02 |
| 5,715,856 | A * | 2/1998 | Martin | A01J 5/00 |
| | | | | 119/14.34 |
| 5,979,359 | A | 11/1999 | Hansson | |
| 6,167,838 | B1 * | 1/2001 | van den Berg | A01J 5/007 |
| | | | | 119/14.02 |
| 6,197,538 | B1 | 3/2001 | van den Berg et al. | |
| 6,308,655 | B1 * | 10/2001 | Oosterling | A01J 5/007 |
| | | | | 119/14.08 |
| 8,250,930 | B2 * | 8/2012 | Krone | G01F 23/0076 |
| | | | | 73/861.04 |
| 10,548,291 | B2 * | 2/2020 | Appelquist | A01J 5/08 |
| 2005/0034518 | A1 * | 2/2005 | Wamhof | G01F 1/708 |
| | | | | 73/227 |
| 2007/0020357 | A1 * | 1/2007 | Uni | G01N 21/3577 |
| | | | | 426/72 |
| 2007/0272159 | A1 * | 11/2007 | Francke | A01J 5/007 |
| | | | | 119/14.14 |
| 2007/0289536 | A1 * | 12/2007 | Dunn | A01J 5/0138 |
| | | | | 119/14.14 |
| 2009/0145362 | A1 | 6/2009 | Eriksson et al. | |
| 2010/0285523 | A1 * | 11/2010 | Pinsky | G01N 33/04 |
| | | | | 435/39 |
| 2014/0130745 | A1 * | 5/2014 | Van Halsema | G06K 9/00362 |
| | | | | 119/14.08 |
| 2015/0146194 | A1 * | 5/2015 | Schonrock | G01N 21/84 |
| | | | | 356/73 |
| 2015/0241336 | A1 * | 8/2015 | Krief | A01J 5/0135 |
| | | | | 356/409 |
| 2016/0258859 | A1 * | 9/2016 | van den Engh | G01N 15/1463 |
| 2017/0191943 | A1 * | 7/2017 | Schonrock | G01N 33/04 |

FOREIGN PATENT DOCUMENTS

| | | | | |
|---|---|---|---|---|
| EP | 1000535 A1 * | 5/2000 | | A01J 5/0131 |
| GB | 2154007 A * | 8/1985 | | A01J 5/01 |
| WO | WO 97/15901 A1 | 5/1997 | | |
| WO | WO-9715901 A1 * | 5/1997 | | A01J 5/0175 |
| WO | WO-0119170 A1 * | 3/2001 | | A01J 5/0133 |
| WO | WO 2005/067702 A1 | 7/2005 | | |
| WO | WO-2010093239 A2 * | 8/2010 | | A01J 5/01 |
| WO | WO 2014/055011 A1 | 4/2014 | | |

OTHER PUBLICATIONS

Aernouts, B. et al., "Visible and near-infrared bulk optical properties of raw milk," Journal of Dairy Science, vol. 98, No. 10, 2015, pp. 6727-6738.

Aernouts, B. et al., "Visible and near-infrared spectroscopic analysis of raw milk for cow health monitoring: Reflectance or transmittance?" Journal of Dairy Science, vol. 94, No. 11, 2011, pp. 5315-5329.

* cited by examiner

MILKING SYSTEM

TECHNICAL FIELD

The present invention relates to a milking system for milking a dairy animal, comprising a milking cup for obtaining the milk, with a teat space having a first milk outflow opening. The system has a measuring chamber for at least temporarily containing the obtained milk and a sensor device for measuring a property of the milk in the measuring chamber, wherein the sensor device comprises an optical sensor device having a plurality of optical sensor elements and at least one light source configured to shine light via at least a part of the milk onto the sensor elements and to generate sensor signals therein, further comprising a control unit which is configured to process the sensor signals into values of a parameter of the milk in the measuring chamber.

BACKGROUND

Such milking systems are known per se from the prior art. Thus, for example, each milking robot, such as the Lely Astronaut®, has a system for monitoring milk quality, milk volume and the like, by measuring at least one milk parameter.

In practice, it has been found that it is not readily possible to take reliable measurements of the milk quality or other milk parameters using a compact milking system, and which can be responded to quickly.

SUMMARY

It is an object of the present invention to provide a milking system of the type mentioned in the introduction which is able to perform quick and reliable measurements of the milk using a compact and lightweight system.

The invention achieves this object by means of a milking system as claimed in claim 1, in particular a milking system for milking a dairy animal, comprising a milking cup for obtaining the milk, with a teat space having a first milk outflow opening, a measuring chamber directly and rigidly connected to the milking cup for at least temporarily containing the obtained milk and provided with a milk inflow opening which is in flow communication with the first milk outflow opening, a second milk outflow opening, a vacuum outlet which is connectable, and in particular connected, to a reduced-pressure pump and a sensor device for measuring a property of the milk in the measuring chamber, wherein a flow path of the milk runs from the first milk outflow opening via the milk inflow opening through the measuring chamber to the second milk outflow opening, wherein the sensor device comprises an optical sensor device having a plurality of optical sensor elements and at least one light source configured to shine light via at least a part of the milk onto the sensor elements and to generate sensor signals therein, further comprising a control unit which is configured to process the sensor signals into values of at least two different parameters of the milk in the measuring chamber, wherein the parameters comprise at least a milk level in the measuring chamber, and at least one out of a content of a milk component and a color.

In this case, the invention uses the insight that it is beneficial for the reliability and the measurement if this is carried out at a location as close as possible to the source of the milk, without influencing the milking operation itself. In the invention, it was decided to arrange the sensors in a measuring chamber which is directly and rigidly connected to the milking cup. In other words, the milking cup ends in the measuring chamber, which measuring chamber also hangs underneath the dairy animal during milking via the milking cup. This ensures that, in principle, the milk changes as little as possible after emerging from the teat, and thus that the measured values correspond as far as possible to the "actual" values of the milk.

It should be noted here that some foam nearly always forms during milking, because some (leakage) air is supplied to the space in which the milk ends up for the purpose of transporting the milk through pipes. As a result of said air, and said milk foam, the milk becomes a two-phase system, in which it is more difficult to take reliable measurements, both in terms of milk properties and milk volume. In order to as far as possible limit and counteract this disadvantageous effect, the milking system according to the invention is further provided with a vacuum outlet in the measuring chamber. As a result, there are fewer to no more problems caused by the air, which is already extracted during or even before the formation of milk foam. As a result, a single-phase system once again arises, containing (almost) exclusively milk.

In the present application, the phrase "intended via at least a part of the milk" comprises both the possibility that light passes through a part of the milk and shines onto the sensor elements, thus transmission or scattering, and the possibility that light rebounds from (a surface of) the milk, thus reflection. Combinations are of course also possible.

It is further advantageous to keep the unit which hangs from the teat compact, and to keep its weight low. This is because an unnecessarily large milking (cup) system of an unnecessarily high weight is a hindrance to the dairy animal during the milking operation. That is not relevant for measuring systems which take measurements from the milk at a location which is far removed from the dairy animal, but it is taken into account in the present invention by virtue of the fact that the sensor device uses one and the same optical sensor device for various relevant parameters. Although, in this case, such a sensor device has a plurality of sensor elements, it is quite simple in optical sensor devices to make these so small that the advantage of a very compact sensor device for a plurality of parameters can still be obtained. It should be noted that the control unit, in contrast to the sensor device, does not need to be accommodated in the milking cup or measuring chamber. That is of course possible, but in order to save space and weight it may also be accommodated elsewhere on the milking device, with the sensor device transmitting the measured values to the control unit via a data connection.

According to the invention, the control unit is configured to process the sensor signals into values of at least two different parameters of the milk in the measuring chamber, wherein the parameters comprise at least a milk level in the measuring chamber, and at least one out of a content of a milk component and a color. It will be clear that milk volume is a very important variable for the dairy farmer, with a great influence on operations and animal management. Measuring volume in a single-phase system of milk is much more reliable than in a two-phase milk/air mixture. Using the optically measured milk level, it is already possible in a simple manner to obtain a reliable measurement of the milk volume, as will be explained in further detail below. Another important milk variable is the composition, in particular the fat and/or protein content. Yet another important variable is the color, and specifically whether there is blood in the milk, which quickly leads to a red discoloration of the milk, whereupon the milk needs to be rejected for human consumption. Composition and color may also be readily measured using an optical sensor device, as will be explained in further detail below.

Particular embodiments are described in the dependent claims and in the following description.

In embodiments, the second milk outflow opening is located on the underside of the measuring chamber during milking. As a result, not only pre-milk but also main milk can be collected in order to be measured, because the milk in the measuring chamber is then constantly refreshed. In the prior art, a volume of milk is sometimes collected at the bottom of a measuring chamber, wherein later milk flows by above to the actual measuring chamber, with no or hardly any mixing with the first or pre-milk occurring. Thus, it is in fact only possible to measure the first milk or pre-milk. In the embodiment of the present invention mentioned here, this is eliminated by virtue of the fact that the milk is collected in the measuring chamber, but furthermore, on the one hand, leaks away via the second milk outflow opening and, on the other hand, is replenished from the milking cup. In this case, "on the underside" is understood to mean "in the bottom quarter of the height of, and advantageously on the underside of" the measuring chamber. Incidentally, these embodiments are particularly advantageous if at least a part of the sensor device is located in the vicinity of the second milk outflow opening. This may be advantageous, for example, in order to be able to carry out measurements on the milk as quickly as possible, already during the first pulsations of milk.

Highly advantageous embodiments comprise a controllable closure means for the measuring chamber. In this case, the closure means may be controllable by the control unit, or by a separate closure control unit, such as a simple clock. The control unit may, for example, and preferably, be configured to control the closure means on the basis of a milk level in the measuring chamber, in such a way that the closure means is opened if a milk level increases or exceeds a predetermined upper threshold, and is closed if a milk level decreases or falls below a predetermined lower threshold. This may serve to stabilize the milk level in the measuring chamber or even (as far as possible) to keep it constant. This, in turn, offers advantages when measuring parameter values in the measuring chamber, given that a constant milk level as far as possible counteracts undesired variations, such as caused by hydrostatic pressure differences, in these parameter values.

In additional or alternative embodiments, the parameters comprise a height of a foam layer on the milk. This thickness of the foam layer may, for example, be determined by assessing the transmittance of the milk or foam layer (in principle, foam allows more light through, and air of course yet more) or by reflection of light from the milk or foam layer (in principle, foam reflects less light than milk, but air of course none). A relatively sudden change in the signal as a function of the height then indicates a boundary layer, between milk and foam and between foam and air. The control unit is then in each case configured to detect such a transition, and to infer the thickness of the foam layer from the associated heights of the sensor elements involved. The control unit is further advantageously configured to control the closure means on the basis of the measured thickness of the foam layer, or on the total thickness of milk plus foam layer. For example, it may be advantageous to keep the thickness of milk plus foam layer as constant as possible, because that means that inflowing milk comes into contact with material present in the measuring chamber in each case at virtually the same height. In principle, this leads to as constant as possible, in particular as little as possible, further foaming of the milk which is present, so that the thickness of the foam layer will advantageously be able to decrease as much as possible or as quickly as possible. However, other control mechanisms for the control unit are also possible.

The closure means is advantageously a valve, which can be opened and closed by the control unit or the closure control unit. Advantageously, the closure means comprises a proportional valve, with a variably adjustable passage opening. More advantageously, the control unit or closure control unit is configured to adjust the passage opening of the proportional valve on the basis of a milk level in the measuring chamber, in particular in such a way that the milk level is kept substantially constant. This provides measuring conditions which are as constant as possible in the measuring chamber, so that the measurements taken there gain as much reliability as possible. Of course, all of this (keeping the level constant, measurement reliability, etc.) applies to the period during milking operations. The milk level referred to in this respect can be measured using the sensor device in the measuring chamber, or optionally using another or additional measuring device, such as a weight measuring device of the measuring chamber, or the like.

The optical sensor device is not subject to any particular limitations per se. In embodiments, the sensor device comprises an array of optical sensor elements. It should be noted here that such sensor elements may, for example, be picture elements on a chip or the like, and may therefore be very small, in accordance with current technology. Effectively, and in embodiments, such an optical sensor element comprises a set of picture elements, or pixels, such as 1 red, 1 green and 1 blue pixel. The array may thus, for example, consist of a group of the same optical sensor elements, or a group of different sensor elements, or a group of, optionally the same, sensor elements composed of sub-elements. The array may be a linear group, or a rectangular group, or also an irregularly formed group, for example along the flow path of the milk.

The at least one light source of the milking system is not subject to any particular limitations. In embodiments, the milking system comprises a plurality of light sources, in particular with differing peak wavelength. Here, 'peak wavelength' is understood to mean the wavelength at which the sensor element has the highest sensitivity. The bandwidth of the sensitivity may, in this case, be narrow or relatively broad. Advantageously, the bandwidths of the sensor elements overlap, so that the entire spectrum can be measured. In this way, many different measurements can be taken from the milk, so that it is also possible to record spectra of the milk. In this way, for example, a composition of the milk can be determined, since different constituent parts of the milk have different absorption spectra. By looking at the overall picture for different frequencies, the mutual relationship of the constituent parts, such as milk fat and protein, can be approximately determined. For details and examples, reference is made by way of example to EP1000535A1.

The milking system may advantageously be configured to carry out a follow-up action on the milk depending on this measurement, in particular directing the obtained milk to a measurement-dependent destination. It is thus possible, for example, to obtain a difference in tank milk quality, such as a relatively high, or low, milk fat content.

In particular, the milking system comprises the same number of light sources as sensor elements. The light sources and sensor elements can thus be adapted to each other in an optimum manner, both in terms of peak wavelength and spectral sensitivity and also the mutual position of light source and sensor element. Nevertheless, other combinations of numbers are also possible. It is also possible to provide one or several broadband light sources, so that a relatively compact construction can be obtained. The light sources used may comprise one or more types of LEDs, laser diodes, but also (halogen) incandescent lamps, etc.

In embodiments, the sensor elements have different wavelength sensitivity. In this case, a single light source may already be sufficient to also be able to determine different milk parameter values using different sensors of this type, or the same light-sensitive elements with different filters. If the sensor elements themselves have different wavelength sensitivity, it is often possible to achieve a higher sensitivity. Examples of sensor elements are silicon or germanium photodiodes, or also cameras such as CCDs.

In embodiments, the plurality of optical sensor elements, in particular the array, comprise at least two of the same sensor elements. This offers the advantage that the same measurement can be carried out twice or more. Not only can this provide redundancy of the measurement, resulting in higher reliability and/or accuracy, but it can also provide the possibility of carrying out the same measurement at different locations or times. In particular, at least two of the same sensor elements are arranged along the flow path. This offers, for example, the possibility of determining milk speed along the flow path. If a first of the sensor elements measures a certain change in the signal, and a following sensor element measures the same change in the signal an amount of time t later, the milk speed can be simply inferred by dividing the length of the flow path between the two sensor elements by the amount of time t. Together with the (average) cross-sectional area, which is known or to be determined, at the location of the flow path between said sensor elements, this gives the flow rate of the milk. However, other measurements are not excluded.

In embodiments, a plurality of the sensor elements, in particular the array, extend over substantially the height of the measuring chamber. It should be noted here that it is the group of sensor elements, and not necessarily each of the sensor elements, which extends over the height. In this case, "substantially the height" is understood to mean a height within the measuring chamber which is in practice useful for determination. Of course, the entire internal height of the measuring chamber is covered by this expression, but another useful height is the height up to a discharge outlet other than for milk. For example, there is a vacuum discharge outlet in the measuring chamber. It is then not always desirable for the height of the milk to reach up into the vacuum discharge outlet. Therefore, in that case, it is not necessary to be able to measure up to that height.

The plurality of sensor elements which extend over said (useful) height serve, for example, to determine the level of the milk in the measuring chamber. In this case, use can be made of the fact that milk, milk foam and air have different optical properties. Milk absorbs and reflects a large proportion of the light, milk foam significantly less but on the other hand scatters a relatively large amount of light, while air of course absorbs, reflects and scatters very little. By now determining the highest of the sensor elements which measure a large degree of absorption, for example a weak signal, and optionally the highest of the sensor elements which measure a stronger, but still clearly attenuated signal, it is possible to determine the milk level and the milk foam level, respectively. Alternatively, it is possible to look at different wavelengths. For example, the degree of absorption, transmission and/or scattering in milk and milk foam differs for different wavelengths. It is then sufficient to determine the highest of the sensor elements, with such a difference in absorption, transmission and/or scattering being measured at the relevant wavelength. In all cases, the control unit is configured to determine the milk level, and optionally the other parameter value(s), on the basis of the measured signals.

Additionally, it is also possible that a plurality of sensor elements, in particular the array of sensor elements, also extends/extend in another direction during milking, in particular along the flow path. For example, this other direction during milking is substantially horizontal, in particular if the outflow opening for milk is located on a side of the measuring chamber. As a result of the fact that the array then (also) extends horizontally along the flow path, it is possible to take a plurality of measurements from milk without the negative influence of milk foam. After all, in particular the horizontal part of the flow path will extend in the part of the measuring chamber which is lowest during milking, where (nearly) always only milk will be found. A potential foam layer will then be found above, outside the flow path and outside the area where the measurements take place.

In embodiments, the control unit is configured to detect and/or distinguish between particles, in particular flakes or air bubbles, in the milk by evaluating a wavelength, position and/or time dependency of the sensor signals from the plurality of sensor elements. Given a sufficiently high read-out speed of the sensor elements, which is readily possible in particular with the optical sensor elements, it is possible to carry out a time-dependent measurement for all sensor elements, or for each sensor element (or even for each sensor sub-element, such as a pixel). For example, this shows that a transmission value for light, or for a certain color of light, exhibits a temporary trough. In other words, there was temporarily more absorption of that light or that color. This indicates the presence, or the passing by, of a flake in the milk. Such a flake may indicate mastitis, where physical changes in the form of agglomerated somatic cells are visible in the milk. Such milk must be separated from milk intended for human consumption, and the milking device is then preferably configured to separate the milk on the basis of the measured sensor values. This separation is not necessary if an air bubble rather than a flake is measured. An air bubble seems to specifically be measured again when the transmission temporarily rises. An air bubble not only represents a (small) volume which absorbs less, but in particular the air bubble also functions as a small lens which is somewhat able to focus irradiation, so that the intensity increases locally, and thus temporarily owing to movement of the air bubble, or at least varies around an average value instead of only falling with respect to said average value. In practice, it appears to be advantageous to also determine, in addition to an average transmission and/or absorption, a standard deviation of these parameter values, which can be used to decide to detect an air bubble or a flake. It is further advantageous to configure the control unit for "machine learning", which is to say, in this respect, that the one or more criteria in the control unit for detecting or distinguishing between particles are dynamic. By taking many measurements in this milking system and optionally in other, similar milking systems, and carrying out reference measurements, and subsequently evaluating the measurements in the light of the reference measurements, the criteria can be refined, so that the reliability of the detection and distinction will increase. All of this may in principle also be configured to be automated by virtue of the fact that another measuring device is temporarily or permanently coupled to the milking device, and in particular to the control unit. The other measuring device is, for example, a reference measuring device configured to detect particles and flakes, such as a system based on optical cytometry or the like. The results from the other measuring device can be automatically linked to the measurements from the sensor device in the milking system according to the invention. Through curve fitting and other techniques, the criteria which are used, on the basis of the measurements from the sensor device, to arrive at optionally detecting air bubbles or flakes can be adapted dynamically.

If a plurality of sensor elements are provided, in particular along the flow path, it is possible to carry out a position-dependent measurement. This is advantageous, in particular, in order to repeat a measurement from one location in a location downstream. A repeated detection of a flake will thus be more reliable than a single detection, although it is possible that later measurements will miss the flake. The redundancy which is therefore possible thus increases the reliability. Furthermore, a speed measurement of the milk is also possible in this way. In this case, it is assumed that the speed of a particle is virtually identical to the speed of the milk. Here, too, it is once again the case that the milk speed, together with the known cross section of the pipe, leads to a flow rate, and in this way to a volume of obtained milk. It should be noted here that volume measurements up to now have been relatively unreliable, since these were mostly based on flow rate measurements in milk/air mixtures or weight measurements taken from the milking glass. However, the latter require often-repeated calibration, meaning that interim measurements are always unreliable.

In embodiments, the sensor device comprises at least two part devices, wherein each part device comprises a plurality of sensor elements and a plurality of light sources, wherein the light sources of each part device are configured to shine light onto one or a plurality of the sensor elements of another part device. It is thus more readily possible to take not only transmission measurements but also reflection measurements. In this case, one or a plurality of the sensor elements of a first part device capture reflected light which is emitted by one or more of the light sources of the same part device. In this case, the associated sensor elements and light sources in a part device are mechanically coupled to one another to form a rigid unit, such as on a board/PCB. The other part devices are then separate units, such as boards or PCBs. This does not alter the fact that the different part devices can subsequently be rigidly coupled to one another again, such as opposite one another, in order, for example, to be able to take reliable measurements, such as by mutual attachment using screws or the like. Nevertheless, the part devices in that case are still always recognizable as such, and are often also detachable from one another.

In this case, the control unit is configured to process the signals from the sensor elements depending on the amount of reflection or transmission/absorption. All of this may, for example, be taken into account by actuating the light sources in a manner separated over time, so that a reflection measurement can clearly be distinguished from a transmission/absorption measurement.

In particular, light sources and sensor elements are provided in an alternating pattern, such as a checkerboard pattern. More particularly, the part devices are elongate, and they are provided in a manner in which they are rotated at an angle, such as 90°, with respect to one another. This provides a sensor device which is highly suitable for taking, inter alia, milk composition measurements. In this case, use is made of the insight that the milk fat can readily be measured by measuring dispersion of light. Milk fat globules disperse/scatter light. In order to readily be able to measure this dispersion, it is advantageous if the sensor device is relatively wide, and then advantageously in at least two directions, such as in the present embodiment. Even if the dispersion is in principle isotropic, it is also once again the case here that redundancy in the measurements may increase the reliability.

In particular embodiments, one or a plurality of light sources comprise focusing means, in particular a collimator, configured to form a narrow light beam, which illuminates a single sensor element, or only a limited number of sensor elements. This offers the advantage that the scattering has a relatively greater effect on the signal. A greater fat content, which is associated with larger and/or more fat globules, will thus scatter more light, meaning that the associated sensor element will capture less light.

BRIEF DESCRIPTION OF THE DRAWINGS

The invention will be explained in more detail below by means of one or more exemplary embodiments and the drawing, in which.

DETAILED DESCRIPTION

Figure 1:
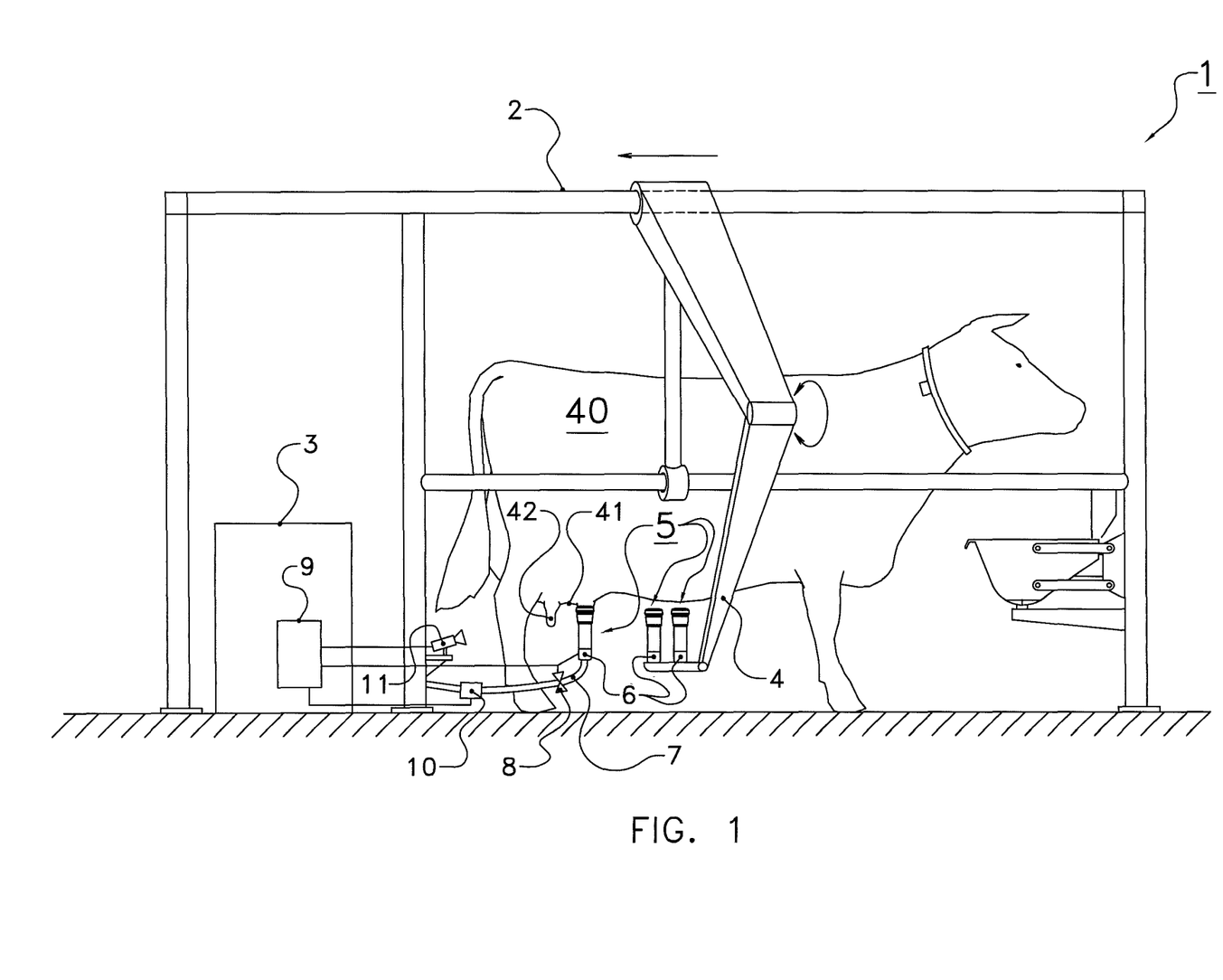
FIG. 1 shows a diagrammatic side view of a milking system according to the invention.

FIG. 1 shows a diagrammatic side view of a milking system 1 according to the invention. The milking system 1 comprises a milking stall 2 with a robot 3 having a robot arm 4, and also a milking cup 5 having a measuring chamber 6 and a milk hose 7 in which there is a valve 8. Reference numeral 9 denotes a control unit and reference numeral 10 denotes a milk hose milk flow meter. Reference numeral 11 denotes a camera.

Furthermore, reference numeral 40 denotes a dairy animal with an udder 41 and teats 42.

The illustrated milking system is a milking robot system, which can attach the milking cups 5 fully automatically to the teats 42 of a dairy animal 40, such as a cow. Nevertheless, the invention can likewise be applied to a conventional milking system, where the milking cups are connected to the teats by hand. In the illustrated robot milking system, parts which are not essentially important to the invention, such as a teat detection system and milk pump, are not shown.

The milking cup 5 comprises a measuring chamber 6 which ends in a milk hose 7. The milk hose 7 can be closed using a valve 8 which is under the control of a control unit 9. The milk hose milk flow meter 10 is arranged on the milk hose 7 downstream of the valve 8 in order to measure the milk flow through the milk hose 7 during milking. This milk hose milk flow meter 10 is connected to the control unit 9, and also to the camera 11. Said camera 11 may serve not only as an aid for determining the position of the dairy animal 40 or the teats 42, but in particular for determining a position of the milking cup 5 on the teat 42. Depending on the form of the udder and the teat 42, it may be the case that the milking cup 5 does not hang entirely vertically, but at an angle to the vertical. In addition, the camera 11 may also serve to determine the height of the milking cup 5 and optionally of the valve 8. This height/these heights may be important in determining the milk flow on the basis of the passage opening of the valve 8. All of this will be explained in more detail with reference to FIG. 2.

Figure 2:
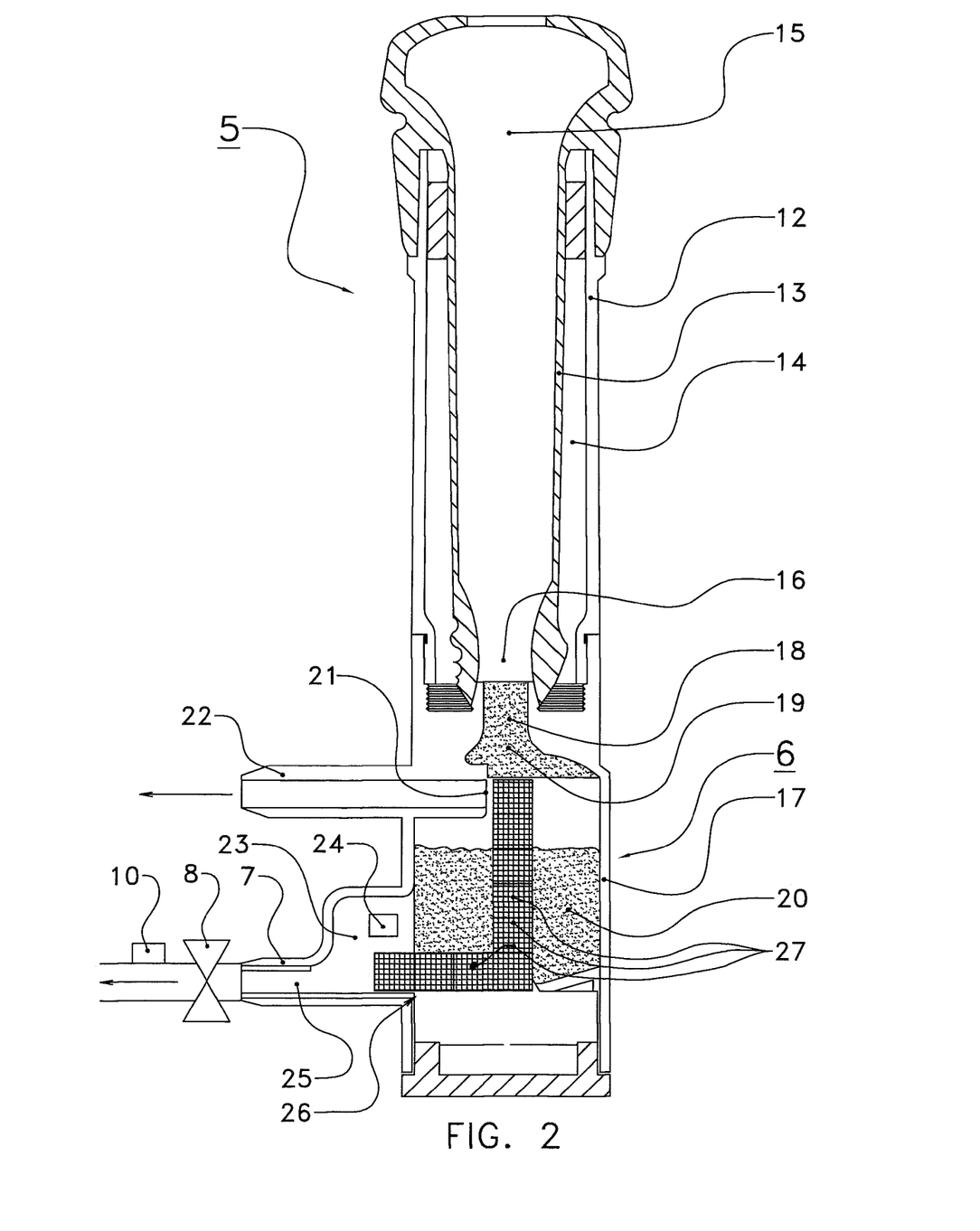
FIG. 2 shows a diagrammatic cross section of part of a milking system according to the present invention.

FIG. 2 shows a diagrammatic cross section of part of a milking system according to the present invention. In this figure, similar parts are denoted by the same reference numerals.

The milking cup 5 comprises a cup casing 12 and a lining 13, enclosing a pulsation space 14 between them. In the lining, there is a teat space 15 which ends in a first milk outflow opening 16. A housing 17 for the measuring chamber 6 forms a rigid unit with the milking cup 5. The first milk outflow opening 16 opens (almost) directly into the milk inlet 18 which is connected to the measuring chamber 6 via a convex outflow 19. In this case, there is milk 20 in the measuring chamber 6. Above it, a vacuum line 22 is connected via a vacuum outlet 21. Reference numeral 23 denotes a measurement constricted section, and reference numeral 24 denotes a stirring device. The measurement constricted section 23 ends in the milk hose 7, via the second milk outflow opening 25.

Reference numeral 26 denotes an optical sensor device which comprises a series of optical sensor elements 27. The optical sensor elements 27 are in this case provided in an L shape, and each comprise an array of picture elements, or pixels (not shown in detail here). The pixels may be either generally light-sensitive or specifically color-sensitive, such as red-sensitive, green-sensitive or blue-sensitive, thus forming an RGB sensor or chip. If desired, the sensor element may be supplemented with (near-)infrared-sensitive pixels. In principle, any other form of the optical sensor device is also possible. In this case, use is made of the fact that the individual light-sensitive parts, the "pixels", are so small that providing a plurality of pixels, and even a plurality of groups of pixels, does not result in an excessively large sensor device 26. In principle, it is even possible to consider all pixels as one large "camera", in color or even black-and-white, with predetermined groups of pixels then being selectable by the control unit in order to also measure local properties of the milk. It is important in that case that these groups are coupled to fixed locations in the measuring chamber, so that such selected groups of pixels effectively function as individual sensor elements, and also that the sensor device 26 with the control unit 9 is configured as a whole to measure the height and at least one substance property of the milk in the measuring chamber, selected from the color and a content of a milk component. In this case, it is sufficient for a height measurement to provide a vertical series of light-sensitive elements, which can be sensitive to each type of light, whereas for the substance property of the milk it is possible, for example, to provide a group of pixels which are sensitive to different colors. In all cases, it is necessary that the control unit 9 is configured to process the various signals from the sensor device 26 into different properties, comprising the height of the milk and also one or more substance properties, comprising at least one out of a color and a content of a component of the milk. It should be noted that FIG. 2 is not to scale, and that the sensor device can be much narrower, particularly in its width, without losing the possibility of measuring the height. The horizontal branch is also not necessary, but may be useful in order to measure (horizontal) displacement and displacement speed.

In embodiments, the milking system according to the invention comprises the illustrated rigid combination of a milking cup 5 and a housing 17 with the measuring chamber 6. The milk obtained from the teat in the teat space 15 flows to the measuring chamber 6 via the first milk outflow opening 16 and the milk inlet 18 directly via the outflow 19. The convex form of the outflow 19 and the resulting Coandă effect means that the incoming milk will for the most part "adhere" to the wall of the housing 17, thus resulting in minimal foaming. Partly as a result thereof, a volume of single-phase milk 20 will in principle be formed at the bottom of the measuring chamber 6, with only air being present in the space above. This air, although it is under a lower than atmospheric pressure, can be extracted via the vacuum outlet 21 and the vacuum line 22, which are connected to a vacuum system of the milking system which is not illustrated in more detail here. In principle, the pressure will correspond to a normal milk vacuum, such as around 40 kPa.

The stirring device 24 is optional, and ensures that the milk 20 in the measuring chamber 6 can have homogeneous properties. It is thus possible, in particular, to prevent a supernatant layer of cream. Incidentally, only a rotatable element 24 is illustrated, with a rotation device being provided in the base of the housing 17.

The housing 17 of the measuring chamber 6 and the cup casing 12 of the milking cup 5 form a rigid unit here. The direct connection offers the advantage of a more direct measurement of milk from the dairy animal. Here, the measurement constricted section 23 is, for example, a narrowed part of the measuring chamber, with two (approximately) parallel walls which may be permeable to light or other radiation or fields. This is of course relevant if the optical sensor device is located outside the measuring chamber, such as on a transparent part of the measuring chamber. It should be noted that a measurement constricted section 23 is not necessary if the optical sensor device is located in the measuring chamber 6.

The obtained milk is (temporarily) collected in the measuring chamber 6, wherein the milk level will begin to rise at the start of the milking. The level of the milk 20 in the measuring chamber 6 may, as a first parameter of the milk, be measured using an optical sensor device 26. In the illustrated embodiment, this comprises a series of optical sensor elements 27 which extend over the height of the measuring chamber 6. The highest optical sensor element 27 which exhibits a signal that satisfies a predetermined criterion, such as a measured transmission above a threshold value, indicates the level of the milk 20.

The optical sensor device 26 is in operational connection with the control unit 9 (not shown here) and transmits a signal related to the measured milk height. The control unit 9 is also connected to the controllable valve 8. The size of the passage opening of the valve 8 is determined by the control unit on the basis of the measured milk level. If the milk level in the measuring chamber 6 rises, at least to above a desired value, then the milk inflow has evidently increased. In order to compensate for this by means of a milk outflow of an (approximately) equal size through the second milk outflow opening 25, the control unit will open the valve 8 further. By contrast, if the milk level falls, the control unit will close the valve further. This achieves a milk level in the measuring chamber 6 which is substantially as constant as possible.

An advantage of this, for example, is that, in the measurement constricted section 23 connected to the measuring chamber 6 and the second milk outflow opening 25, or at least the part of the measuring chamber around which the optical sensor device 26 is arranged, can always be kept entirely submerged in milk but also continuously flowed through by fresh milk. A very reliable measurement of milk properties can thus be ensured.

The optical sensor device 26 may sometimes measure an incorrect height of the milk 20 in the measuring chamber 6, for example if the sensor 26 is located along a wall of the measuring chamber 6 and said wall is at an angle to the vertical, such as when connecting the milking cup 5 to a slanted teat. In order to correct for this, it is possible to use an inclination sensor, such as the camera 11 from FIG. 1. This can ascertain whether the milking cup with the housing 17 of the measuring chamber 6 is at an angle from the vertical and, if so, can ascertain this angle using image-processing software suitable for this purpose. The angle thus obtained can be transmitted to the control unit 9 which can use this to determine the correct height of the milk in the measuring chamber 6 according to simple geometric formulas.

An important variable during milking is the milk flow. The milk flow can be determined in a very simple way on the basis of the height of the milk 20 in the measuring chamber 6 and the size of the passage opening of the valve 8. Where the conditions remain otherwise unchanged, in particular the pressure difference between the vacuum in the top part of the measuring chamber 6, in other words in the vacuum line 22, and the vacuum which prevails in order to discharge the milk through the milk hose 7, the milk flow can be simply calculated using hydrostatic equations. Thus, the control unit 9 from FIG. 1, together with the optical sensor device 26 and the valve 8, could serve as a milk flow meter. In this case, it is assumed that the liquid in the measuring chamber is not a milk/air mixture but substantially pure milk, which is an advantage achieved according to the invention, at least in some embodiments. Nevertheless, it is also possible, in addition to the alternative of calibration measurements, to make this calculation of the milk flow more reliable. To this end, for example, a vacuum sensor may be provided (not shown here) in the vacuum line 22, but it may also be provided in, for example, the top part of the measuring chamber 6. The (milk) vacuum prevailing there, and also the prevailing milk transport vacuum, which is determined by the milking system and can likewise be measured further along the milk hose, determine, together with the height of the milk column, the pressure difference over the passage opening of the valve 8, and thus the volume of the milk flow.

Another variable which can influence the calculation of the milk flow is the height of the milk column above the valve 8. In the diagrammatic representation of FIG. 2, this will be able to be approximately constant, independently of the height at which the milking cup 5 is connected to a teat. However, as the valve 8 may also be located much further along the milk hose 7, for example a meter or more, it may be the case that the height of the milk column above the valve can vary greatly depending on the height of the teats of the dairy animal. In order to be able to take into account this height, it may be advantageous to use, for example, the camera 11 from FIG. 1 to determine the height of the milking cup and/or of the valve 8. From the height difference, it is in particular possible to determine a difference in height of the milk column, which fills the measuring chamber up to and including the part of the milk hose 7 up to the valve 8. It should be noted here that the teat height is a property of the animal, which may also be stored and searched for in the control unit 9 of the milking system. In this case, it is assumed that the resulting position and form of the milk hose, and thus the height difference between the measuring chamber 6 and the valve 8, is substantially constant during each milking operation of said dairy animal. In this case, other measurement methods and sensors for determining and taking into account this height difference are not ruled out.

It is also possible to provide an additional milk flow meter, in particular a milk hose milk flow meter 10. In FIG. 2, this is located downstream of the valve 8, but could also be between the measuring chamber 6 and the valve 8. As the milk flow is a single-phase system at the location of the milk hose milk flow meter 10, a great variety of different meters may be used, in particular including very simple and reliable meters. An example of this is a milk flow meter on the basis of the magnetohydrodynamic principle, which has the advantage that it can measure the milk flow in an entirely contactless manner.

The optical sensor device 26 is not only configured to measure the height of the milk 20 in the measuring chamber 6 but also one or more other milk properties. For example, the optical sensor elements 27 determine a color of the milk, by measuring incident and reflected light, or absorbed/transmitted light. To this end, either an external light source may be used, or a light source provided in the milking system for this purpose, the latter offering the advantage of better controllability and higher intensity owing to the smaller distance. These are not illustrated here, but will be explained in more detail below. The color can be determined for each sensor element 27 (locally), with it being possible to ignore a measurement above the level of the milk. By evaluating all of the measured colors, it is possible to reach a conclusion about the entire milk. For example, a single measurement of a slight red discoloration, which is not repeated in any other optical sensor element 27, could be considered to be a false positive red measurement, meaning that the milk does not have to be rejected after all. The measurement can thus be more reliable than when a single sensor determines a value for the entire milk.

In this way, a color gradient may also be recognized, such as resulting from supernatant milk foam, or an inhomogeneous layer of milk. In addition, deviations such as milk containing blood, which is colored more strongly red than consumption milk, may be recognized. The milking system may also be configured to direct the obtained milk to a predetermined destination on the basis of such deviations, such as to a sewer in the case of milk containing blood. The steering means suitable for this purpose, such as valves and the like, are not illustrated here.

The sensor device may also be configured to measure a whole or partial spectrum, in other words a series of values for the intensity of the reflected, transmitted or scattered light in two or more wavelength regions. On the basis of such a spectrum, more conclusions can be drawn than with a single value, for example only red, as discussed above. If, for example, the (standard) red, green and blue wavelength regions of an RGB chip are selected, conclusions can already be drawn about contents of fat and/or protein of the milk 20. To this end, the pixels of the optical sensor elements 27 may be correspondingly sensitive, for example using suitable color filters. Reference is made, inter alia, to EP1000535A1 and the article "Visible and near-infrared bulk optical properties of raw milk" by Aernouts et al. in J. Dairy Sci. 98:6727-6738. It should also be noted here that, with the aid of calibration measurements, a self-learning milking system can be provided, which can improve the more measurements it performs. It is also possible to increase the amount of data in another way. For example, an NIR-sensitive element can be added to the RGB chip, so that the number of wavelength regions increases. An example of such a system is the AfiLab system from Afimilk. It is also possible, instead of or in addition to the standard RGB regions, to measure more wavelength regions, by providing correspondingly sensitive optical sensor (sub-)elements/pixels having suitable filters or the like. Ideally, the optical sensor elements 27 are or comprise one or more spectrometers for determining an optical and/or NIR spectrum (in absorption and/or transmission and/or scattering) of the milk, advantageously locally. The control unit is then advantageously configured to determine, optionally locally, a milk property comprising a content of fat, protein, carbohydrates (lactose) or the like. On the basis of these collected values of the one or more milk properties, it is then possible for the control unit to give an improved, i.e. more accurate and/or more reliable, value for this milk property (or these milk properties) of the milk as a whole.

An advantage of the separate local determination of values of milk properties using more than one sensor elements is that it is possible to follow the progress through the measuring chamber. For example, the optical sensor device 26 is configured to detect particles. This is explained in more detail below. Of importance here is that such a particle enters the measuring chamber and, for example, is detected at the top, in a top layer of the milk 20 by a top optical sensor element 27. The particle will move through the measuring chamber 6 and ultimately leave it via the second milk outflow opening 25, and in doing so will move past respectively different optical sensor elements 27 of the optical sensor device 26, in order to be detected there. If such a detection is repeated at all or at least a predetermined number of sensor elements 27, the detection may be considered to be reliable. Furthermore, it is thus possible to determine a speed of the milk in the measuring chamber, by dividing the distance between the respective sensor elements and the time difference of the associated detection. It is thus also possible to determine a value of the content of particles or flakes in the milk, on the basis of which it can be concluded that mastitis is present if that number exceeds a predetermined limit for the number of particles.

Figure 3:
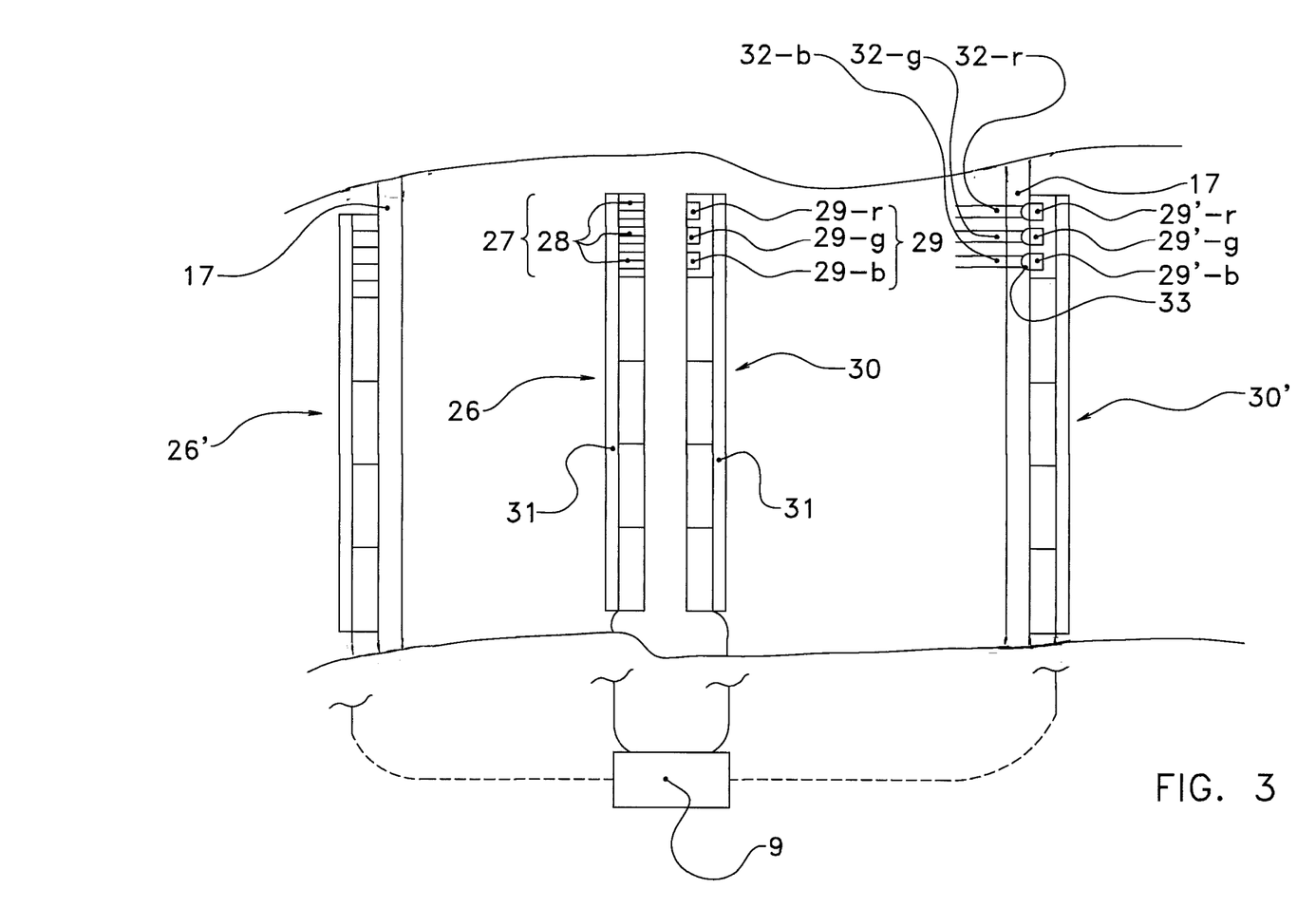
FIG. 3 shows a partial cross section of a detail of a milking system according to the invention.

FIG. 3 shows a diagrammatic partial cross section of a detail of a milking system according to the invention. In this figure, reference numeral 17 is the housing of the measuring chamber, or at least a wall thereof. Inside the housing is an optical sensor device 26 with optical sensor elements 27, each of which comprises a plurality of pixels, and which are provided on a printed circuit board (PCB). Reference numeral 30 denotes a light source, which comprises a plurality of part light sources 29 each having a plurality of LEDs 29-r, 29-g, 29-b, and which are provided on a printed circuit board 31 (PCB). The printed circuit boards 31, and thus the sensor device 26 and the light source 30, are operatively connected to the control unit 9.

Furthermore, alternative positions for the sensor device and light source are provided, in the form of sensor device 26' and light source 30', which are both arranged outside the housing 17 of the measuring chamber instead of inside. In the case of the alternative light source 30', a series of collimators 33 is further provided, which ensure that the LEDs 29'-r, 29'-g and 29'-b respectively emit more or less parallel light beams 32-r, 32-g and 32-b.

In the arrangement with sensor 26 and light source 30, it will be clear that at least a part of the milk is located between the two, and this part is measured for its optical properties. An advantage of this positioning is that the optical path length is relatively small, and the absorption in the milk which, seen specifically, is relatively high is not so large that it is not possible to take accurate measurements. On the other hand, all this is more susceptible to soiling by encrusted milk residues, and is also more difficult to replace, in respect of which the alternative sensor 26' and/or light source 30' offer better opportunities.

The construction of (each of) the sensor elements 27 is with a series of pixels 28, such as at least 3 pixels (red, green and blue). Alternatively, two or more light-sensitive elements such as photodetectors may be provided, or also more and/or other pixels, such as (near-)infrared-sensitive pixels, or also a plurality of groups of pixels, such as in a CCD-camera-like optical element 27. There are five of such elements 27 provided here one above the other in the vertical direction. In the horizontal direction, this number is undetermined in the figure, and is, for example, one or more. Irregular arrangements are also possible, as in FIG. 2. Any other plural total number of sensor elements 27 is possible.

The number of part light sources 29 in the light source 30 is likewise five here in the vertical direction, in other words equal to the number of sensor elements 27. This offers advantages in terms of the mutual comparability of the measurements. Nevertheless, a smaller or larger number of part light sources 29 is readily possible.

The collimators 33 are provided for focusing light emitted by the LEDs 29' into beams 32-r, 32-g and 32-b. Such beams improve the link between light source and sensor element even further, and such light beams are in particular suitable for measuring scattering of light, which is in turn useful for measuring particles in the milk. All of this will be explained in more detail below.

Many different measurement combinations are possible using such an arrangement, between different LEDs and different pixels, thus for different colors. By actuating or reading out, respectively, the different LEDs and/or pixels in a coordinated manner, the control unit can thus collect a large amount of data, on the basis of which the control unit can very reliably and accurately determine the associated milk properties. The control unit is then advantageously configured accordingly.

Figure 4A:
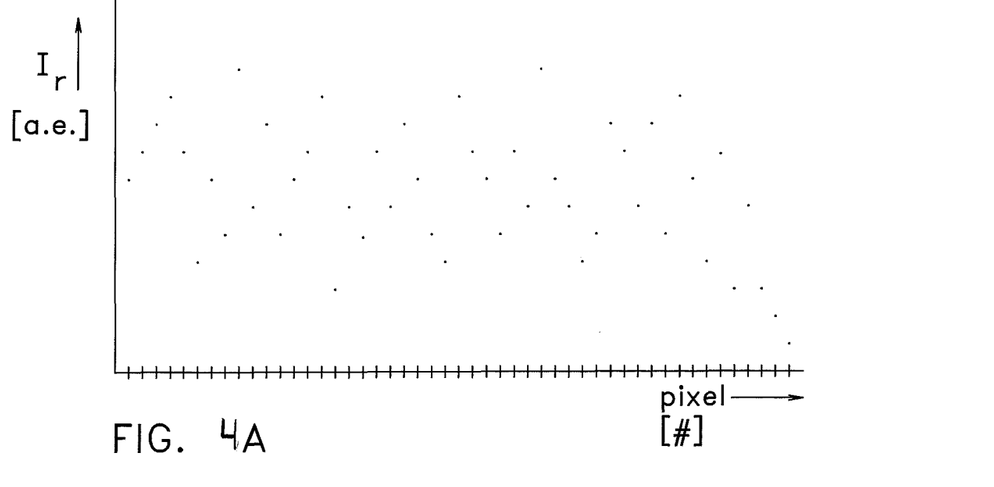
FIGS. 4a and 4b show diagrammatic views of a series of measured values and a further processing thereof.
Figure 4B:
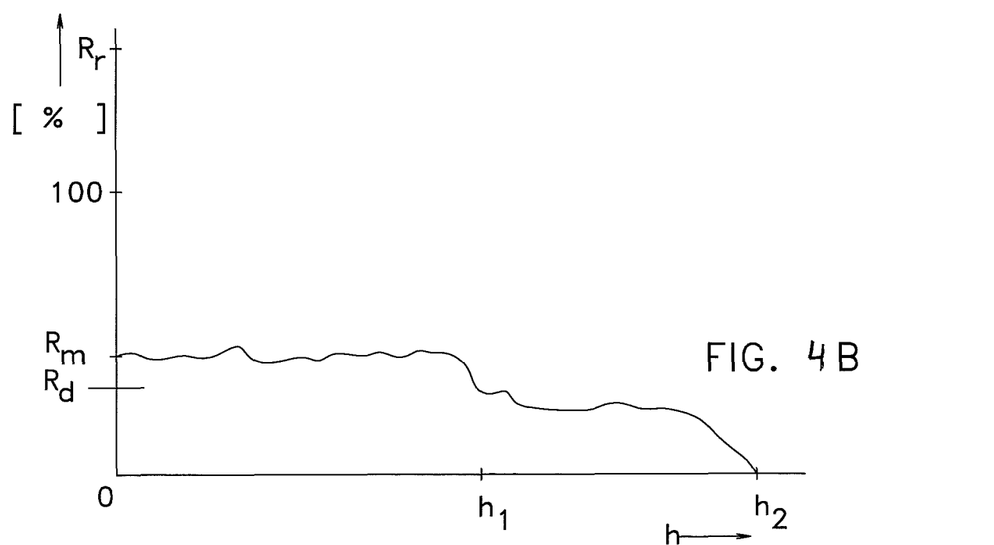

FIGS. 4a and 4b show diagrammatic views of a series of measured values and a further processing thereof.

FIG. 4a shows example measured values of intensity of light emitted by the LEDs 29 of light source 30, measured by pixels 28 in the elements 27. The intensity values measured by the different pixels are plotted for each pixel, and these comprise red, green and blue intensity values. It can be seen that there is a multiplicity of measured intensity values, each of which, or even as a whole, does not yet reveal much in this case without further explanation. However, the control unit is configured to process these values into milk property values.

FIG. 4b shows an example of a processed set of intensity values, specifically looking at the intensity values as measured by only the red pixels 28-r, converted to a reflection percentage and plotted against the height at which the relevant red pixels are located in the measuring chamber. It can be seen that for a height between 0 and $h_1$ the reflection Rm is above a predetermined threshold Rd. That indicates that the milk is redder than this threshold value, which suggests that the milk contains blood. The control unit can subsequently direct the relevant milk to a sewer or other depository not intended for consumption milk. The control unit may also be configured to generate an associated alarm signal, for example to warn an operator or for recording in a logbook. It can also be seen that the reflection value is lower between $h_1$ and $h_2$. The control unit can infer from this that the milk level is $h_1$, and that milk foam is present between the heights $h_1$ and $h_2$. On this basis, the control unit can deduce a milk speed, as is described in more detail in the introductory part of the description.

In addition, the measured intensity value for the different colors, or the wavelengths, can be used by the control unit to determine a fat content, protein content, and/or carbohydrate (lactose) content, for example on the basis of the findings in the above-mentioned article by Aernouts et al. (l.c.), or the article "Visible and near-infrared spectroscopic analysis of raw milk for cow health monitoring: Reflectance or transmittance?" by Aernouts et al., J. Dairy Sc. 94: Pages 5315-5329. If desired, other measurements may be involved in this, such as the scattering values described for FIG. 3 and below for FIG. 5, and a plurality of or different wavelength regions may be measured, in particular in the infrared. Suitable LEDs and/or other sources, and also suitable optical (sub-)elements (pixels with suitable filters) are then provided. Moreover, it is possible to compare the measured values with the contents of fat, protein, lactose and the like as measured in a laboratory or dairy factory in a sample or bulk batch of the milk. On the basis of such comparisons with reference values, the control unit can use machine learning or the like to develop ever more accurate algorithms. It should be noted here that it is not always important to have very reliable absolute values, which is not always simple using some wavelength regions. Sometimes it is also sufficient to be able to detect a reliable trend over time in one or more contents, without knowing an absolute value. The milking system according to the invention and the associated method may be suitable for this purpose.

Figure 5A:
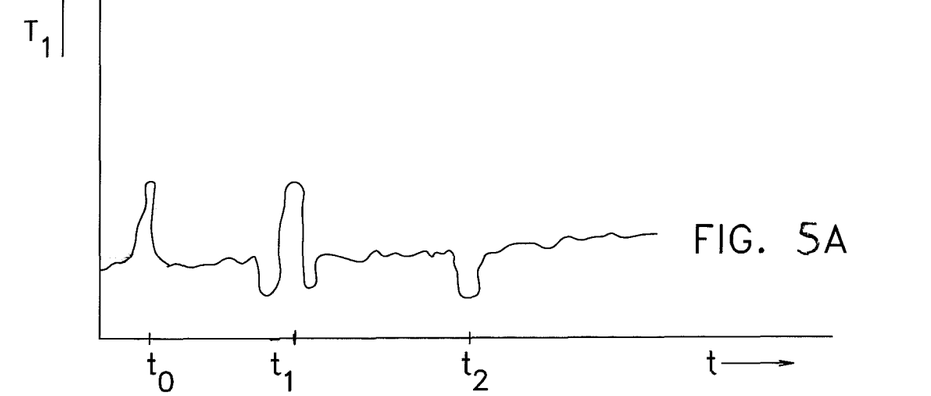
FIG. 5a and FIG. 5b show a timeline of respective transmission values for two different sensor elements.
Figure 5B:
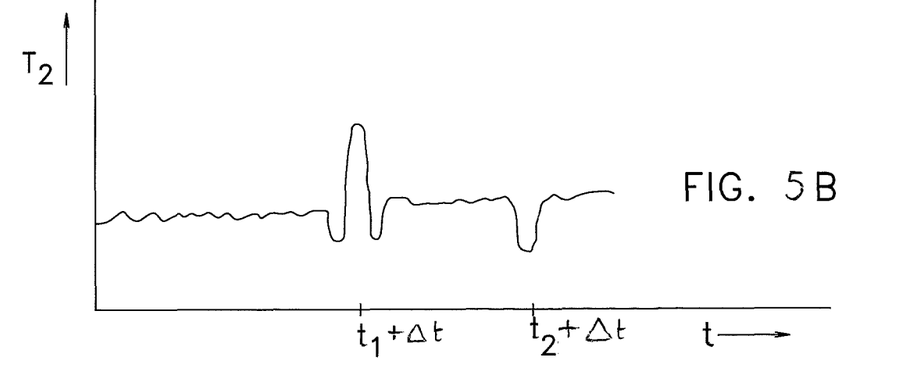

FIG. 5a and FIG. 5b show a timeline of a transmission value $T_1$ and $T_2$, respectively, for two different sensor elements.

Such a transmission value may, for example, be measured using the arrangement from FIG. 3, with the part light sources 29' and collimators 33, which emit respective light beams 32, and which are measured using optical (sub-)elements of the sensor device 26' situated on an opposite side of a measurement constricted section or the measuring chamber. In this case, for example, $T_1$ is measured by an optical sensor sub-element situated at the top of the sensor device 26', whereas $T_2$ is measured by a sensor sub-element situated at the bottom of the sensor device 26'.

If a flake, air bubble or other particle moves into an emitted beam, it will scatter, absorb and/or focus the light in the beam. This is noticeable in the measured signal. For instance, $T_1$ exhibits a peak at time $t_0$, a ripple with peak at time $t_1$, and a trough in the signal at time $t_2$. In principle, the control unit could conclude from this that at $t_0$ a light-concentrating particle is passing by, at time t1 an air bubble is passing by, which scatters light (as a result of which the intensity falls) but also partially focuses light (and at that moment the intensity then increases), and at time $t_2$ a scattering and/or absorbing particle is passing by. It should be noted here that the precise behavior and certainly the absolute values are highly dependent on the properties of the particle, such as dimension and composition. Nevertheless, it is generally possible to reach a conclusion about the character by taking the above into consideration. In practice, however, it is not simple to reliably detect a particle and to qualify it. It helps to have at least a second measurement, in this case in the form of the measurement $T_2$, which takes place further along in the flow direction of the milk, which points downward (at least in the arrangement of FIG. 2). The $T_2$ diagram shows that at time $t_1+\Delta t$ and $t_2+\Delta t$ the signals in $T_1$ at $t_1$ and $t_2$, respectively, are repeated. This indicates that both measurements are correlated and associated with actual particles. These, in principle redundant, measurements thus increase the reliability of the detection of particles. However, it can also be seen that the signal in $T_1$ at $t_0$ is not repeated in $T_2$. Although this does not necessarily have to mean that there was no particle, the chance that this was a mastitis flake is small. Thus, by looking at both the nature of the signal (trough, peak or ripple) and the repetition in another location, mastitis-related particles/flakes can be detected more reliably. Since it is additionally possible to measure the milk flow, at least the volume at any moment, the density of such particles in the milk may also be determined by the control unit. On the basis of the particle density detected by the control unit, the control unit can emit a signal relating to "mastitis yes/no", such as an alarm signal or a signal that directs the milk in question to a destination other than the consumption milk tank.

Furthermore, it is possible for the control unit to determine the milk speed from the measured signals. After all, the correlated signals at $t_1$ and $t_1+\Delta t$ and at $t_2$ and $t_2+\Delta t$, respectively, cover a known distance $\Delta x$ (distance between the relevant detectors/part light sources) over time $\Delta t$. The speed is then simply $\Delta x/\Delta t$. Although this speed may vary for different particles owing to vortices in the milk, an average thereof will be a good indication of the speed of the milk through the measuring chamber. From this, together with the milk height or the cross-sectional area of the second milk outflow opening, the control unit may simply determine the flow rate of the milk, and from this in turn the total volume of milk.

The embodiments shown only serve to illustrate the invention, without limiting it. The scope of protection is defined by means of the attached claims.

The invention claimed is:

1. A milking system for milking a dairy animal, comprising:
    a milking cup for obtaining milk from the dairy animal, with a teat space having a first milk outflow opening,
    a measuring chamber directly and rigidly connected to the milking cup for at least temporarily containing the obtained milk and provided with a milk inflow opening which is in flow communication with the first milk outflow opening, a second milk outflow opening, a vacuum outlet separate from the second milk outflow opening which is connectable to a reduced-pressure pump and a sensor device for measuring a property of the milk in the measuring chamber,
    wherein a flow path of the milk runs from the first milk outflow opening via the milk inflow opening through the measuring chamber to the second milk outflow opening,
    wherein the sensor device comprises an optical sensor device having a plurality of optical sensor elements and at least one light source configured to shine light via at least a part of the milk onto the optical sensor elements and to generate sensor signals therein, further comprising a control unit which is configured to process the sensor signals into values of at least two different parameters of the milk in the measuring chamber,
    wherein the parameters comprise at least a milk level in the measuring chamber, and at least one of a content of a milk component and a color.

2. The milking system as claimed in claim 1, wherein, during milking, the second milk outflow opening is located on an underside of the measuring chamber.

3. The milking system as claimed in claim 1, further comprising a controllable closure means for the measuring chamber, wherein the control unit is configured to control the closure means on a basis of a milk level in the measuring chamber, in such a way that the closure means is opened if a milk level increases or exceeds a predetermined upper threshold, and is closed if a milk level decreases or falls below a predetermined lower threshold.

4. The milking system as claimed in claim 3, wherein the closure means is a valve, wherein the control unit or a closure control unit is configured to adjust a passage opening of the valve on the basis of a milk level in the measuring chamber.

5. The milking system as claimed in claim 4, wherein the valve comprises a proportional valve with a variably adjustable passage opening, and wherein the control unit or closure control unit is configured to adjust the passage opening of the proportional valve on the basis of a milk level in the measuring chamber, in such a way that the milk level is kept substantially constant.

6. The milking system as claimed in claim 1, wherein the sensor device comprises an array of optical sensor elements.

7. The milking system as claimed in claim comprising a plurality of light sources with differing peak wavelength.

8. The milking system as claimed in claim 7, wherein there are a same number of light sources as optical sensor elements.

9. The milking system as claimed in claim 1, wherein the optical sensor elements have different wavelength sensitivity.

10. The milking system as claimed in claim 1, wherein the plurality of optical sensor elements comprise at least two of the same optical sensor elements.

11. The milking system as claimed in claim 10, wherein the plurality of optical sensor elements are an array of sensor elements and the at least two of the same optical sensor elements are arranged along the flow path.

12. The milking system as claimed in claim 1, wherein a plurality of the optical sensor elements extend over substantially a height of the measuring chamber.

13. The milking system as claimed in claim 12, wherein a plurality of optical sensor elements extend in another direction during milking.

14. The milking system as claimed in claim 13, wherein the plurality of optical sensor elements are an array of optical sensor elements that extend along the flow path.

15. The milking system as claimed in claim 1, wherein the control unit is configured to detect and/or distinguish between particles in the milk by evaluating a wavelength, position- and/or time dependency of the sensor signals from the plurality of optical sensor elements.

16. The milking system as claimed in claim 15, wherein the particles are flakes or air bubbles.

17. The milking system as claimed in claim 1,
wherein the sensor device comprises at least two part devices, each part device comprises a plurality of optical sensor elements and a plurality of light sources, and the light sources of each part device are configured to shine light onto one or a plurality of the sensor elements of another part device.

18. The milking system as claimed in claim 1, wherein one or a plurality of light sources comprise focusing means configured to form a narrow light beam, which illuminates a single one of the optical sensor elements, or only a limited number of the optical sensor elements.

19. The milking system as claimed in claim 18, wherein the focusing means is a collimator.

20. The milking system as claimed in claim 1, wherein the first milk outflow opening is connected to the measuring chamber via a convex outflow.

* * * * *